United States Patent [19]

Kamiyama et al.

[11] Patent Number: 5,454,401
[45] Date of Patent: Oct. 3, 1995

[54] METHOD OF LINING A BRANCH PIPE

[75] Inventors: Takao Kamiyama, Hiratsuka; Yasuhiro Yokoshima, Ibaraki; Shigeru Endoh, Saitama, all of Japan

[73] Assignees: Shonan Gosei-Jushi Seisakusho K.K., Kanagawa; Yokoshima & Company, Ibaraki, both of Japan

[21] Appl. No.: 275,106

[22] Filed: Jul. 14, 1994

[30] Foreign Application Priority Data

Aug. 31, 1993 [JP] Japan ..................................... 5-216322

[51] Int. Cl.⁶ .................................................. F16L 55/16
[52] U.S. Cl. .................... 138/98; 138/97; 156/287
[58] Field of Search .................... 138/98, 97; 405/150.1; 156/287; 264/269

[56]  References Cited

U.S. PATENT DOCUMENTS

| 4,368,091 | 1/1983 | Ontsuga et al. | 138/98 X |
| 4,758,454 | 7/1988 | Wood | 138/98 X |
| 4,836,715 | 6/1989 | Wood | 138/98 X |
| 5,329,063 | 7/1994 | Endoh | 138/98 X |

Primary Examiner—David A. Scherbel
Assistant Examiner—Patrick F. Brinson
Attorney, Agent, or Firm—Whitham, Curtis, Whitham & McGinn

[57]  ABSTRACT

A branch pipe lining method of the invention utilizes a branch pipe liner bag impregnated with a hardenable resin and having a flange at one end thereof, wherein the flange is folded out and mounted to a fluid pressure sealing nozzle; the branch pipe liner bag is everted and insertied into a branch pipe; an upper end of the branch pipe liner bag is pulled up by a rope or the like with the flange thereof being secured on the inner wall of the main pipe; the fluid pressure sealing nozzle is removed from the branch pipe liner bag; a sealing pressure bag introduced into the main pipe is expanded to seal a lower opening of the branch pipe liner bag with the sealing pressure bag; the upper end of the branch pipe liner bag is closed, and the branch pipe liner bag is pressed against the inner wall of the branch pipe with a fluid pressure; and the hardenable resin impregnated in the branch pipe liner bag is hardened while the branch pipe liner bag is continuously being pressed against the inner wall of the branch pipe. After the lining is completed, the sealing pressure bag can be easily removed from the branch pipe liner bag after it has been hardened, so that any fragment of the sealing pressure bag will not remain on the inner wall of the branch pipe, with the result that the inner wall surface of the branch pipe can be maintained in a favorable condition.

9 Claims, 12 Drawing Sheets

METHOD OF LINING A BRANCH PIPE

BACKGROUND OF THE INVENTION

1. Field of the Invention

The present invention relates to lining techniques, and more particularly to a method of lining inner walls of aged or defective branch pipes.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to the method described in the above-mentioned publication, the pipe repair method comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the portion of the tubular liner such that the fluid presses the tubular liner to enter the pipe. Since one end of the tubular liner is hooked at the end of the pipe, it remains there while the rest of the flexible liner bag is turned inside out as it proceeds deeper in the pipe. (Hereinafter, this manner of procedure shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the pressurized fluid, and the tubular flexible liner is hardened as the thermosetting resin impregnated in the liner is heated, which is effected by heating the fluid filling the tubular lines bag by means of a hot steam, etc. It is thus possible to line the inside wall of the defective or old pipe with a rigid liner without digging the ground and disassembling the pipe sections.

The above-mentioned method may also be applied to the lining of a branch pipe which is branched from a main pipe, an example of which is illustrated in FIG. 10.

FIG. 10 is a cross-sectional view showing a conventional method of lining a branch pipe. A pressure bag 112 for everting a branch pipe liner bag 104 is inserted into a main pipe 101. A branch pipe 102 to be repaired is branched from the main pipe 101 as illustrated. Since this pressure bag 112 must be separated from the branch pipe liner bag 104, a sealing tube 140 should be connected to the pressure bag 112 in order to apply a pressure to the branch pipe liner bag 104. Then, the pressure bag 112 is supplied with compressed air to evert both the sealing tube 140 and the branch pipe liner bag 104 into the branch pipe 102. While the illustrated state is being maintained, the branch pipe liner bag 104 is, for example, heated to harden a hardenable resin impregnated therein. Thereafter, when the sealing tube 140 is pulled out from the branch pipe 102 (branch pipe liner bag 104), the branch pipe 102 is reinforced by the hardened branch pipe liner bag 104 which has been lined on the inner wall of the branch pipe 102.

The above-mentioned method, however, must prepare the sealing tube 140 of an appropriate length in accordance with variations in length of the branch pipe 102 each time it is to be repaired. Therefore, the sealing tube 140 must be exchanged for each branch pipe according to its length.

To solve this problem, a branch pipe lining method as shown in FIGS. 11 and 12 has been proposed.

More specifically, FIGS. 11 and 12 are cross-sectional views used for explaining a conventional branch pipe lining method which does not need a sealing tube as that indicated by 140 in FIG. 10. This method utilizes a separator tube 240 to realize an air-tight connection between a pressure bag 212 for eversion and a branch pipe liner bag 204. One end of the separator tube 240 is temporarily connected to the branch pipe liner bag 204. In FIG. 11, reference numeral 241 designates a guide tube; 242 an air mat for pressing a flange 204a of the branch pipe liner bag 204 against the inner wall of a main pipe 201; and 203 a robot introduced into the main pipe 201 for the lining operations.

With the flange 204a of the branch pipe liner bag 204 being pressed against the inner wall of the main pipe 201, as shown in FIG. 11, compressed air supplied to the pressure bag 212 causes the branch pipe liner bag 204 to be everted by the pressure of the compressed air and inserted into the branch pipe 202 in the direction indicated by a white arrow. When the insertion of the branch pipe liner bag 204 has been completed, a hardenable resin impregnated in the branch pipe liner bag 204 is hardened, whereby the inner wall of the branch pipe 202 is lined or repaired by the hardened branch pipe liner bag 204.

Referring now to FIG. 12, when the branch pipe 202 has been lined, the pressure bag 212 is moved in the direction indicated by arrows. Since the pressure bag 212 is coupled with the robot 203 through the guide tube 241, the robot 203 is also moved in the same direction. Further, the separator tube 240 temporarily connected to the branch pipe liner bag 204 is torn off from the temporarily connected area so that it is separated from the branch pipe liner bag 204.

As described above, since this conventional method utilizes the separator tube 240 to realize an air-tight connection between the pressure bag 212 and the branch pipe liner bag 204, the same separator tube 240 can be used irrespective of the length of a branch pipe to be repaired, so that the exchange of the sealing tube 140, which would be required by the method shown in FIG. 10, is made unnecessary.

The proposed method however has a drawback that the separator tube 240 may not be completely torn off so that part thereof remains on the inner wall of the branch pipe liner bag, wherein the remaining part acts as burr to cause an unfavorable condition of the inner wall. Specifically, flowing substances within the branch pipe may attach to the burr.

OBJECT AND SUMMARY OF THE INVENTION

The present invention has been made in view of the above-mentioned problem, and it is an object of the present invention to provide a branch pipe lining method which is capable of maintaining the inner wall of a branch pipe in a favorable condition after repair operations.

To achieve the above object, the present invention provides a method of lining a branch pipe using a branch pipe liner bag impregnated with a hardenable resin and having a flange at one end thereof, comprising the steps of: folding out the flange to mount the same to a fluid pressure sealing nozzle; everting the branch pipe liner bag and inserting the same from a main pipe into a branch pipe toward the ground, pulling up an upper end of the branch pipe liner bag with the flange thereof secured on the inner wall of the main pipe; removing the fluid pressure sealing nozzle from the branch pipe liner bag; expanding a sealing pressure bag introduced into the main pipe to seal a lower opening of the branch pipe liner bag with the sealing pressure bag; closing the upper end of the branch pipe liner bag, and pressing the branch pipe liner bag against the inner wall of the branch pipe with a fluid pressure; and hardening the hardenable resin impregnated in the branch pipe liner bag while the branch pipe liner bag is continuously being pressed against the inner wall of the branch pipe.

According to the present invention, an air-tight connection between the pressure bag for eversion and the branch pipe liner bag is acheved without using a conventional separator tube, and the lower opening of the branch pipe liner bag is sealed by the sealing pressure bag during hardening the branch pipe liner bag, so that any defective residue remains on the inner wall of the branch pipe and accordingly its surface is maintained in a favorable condition.

The above and other objects, advantages and features of the invention will appear more fully hereinafter in the following description given in connection with the accompanying drawings and the novelty thereof pointed out in the appended claims.

DESCRIPTION OF THE PREFERRED EMBODIMENTS

The present invention will hereinafter be described in connection with a preferred embodiments thereof with reference to the accompanying drawings.

Figure 1:
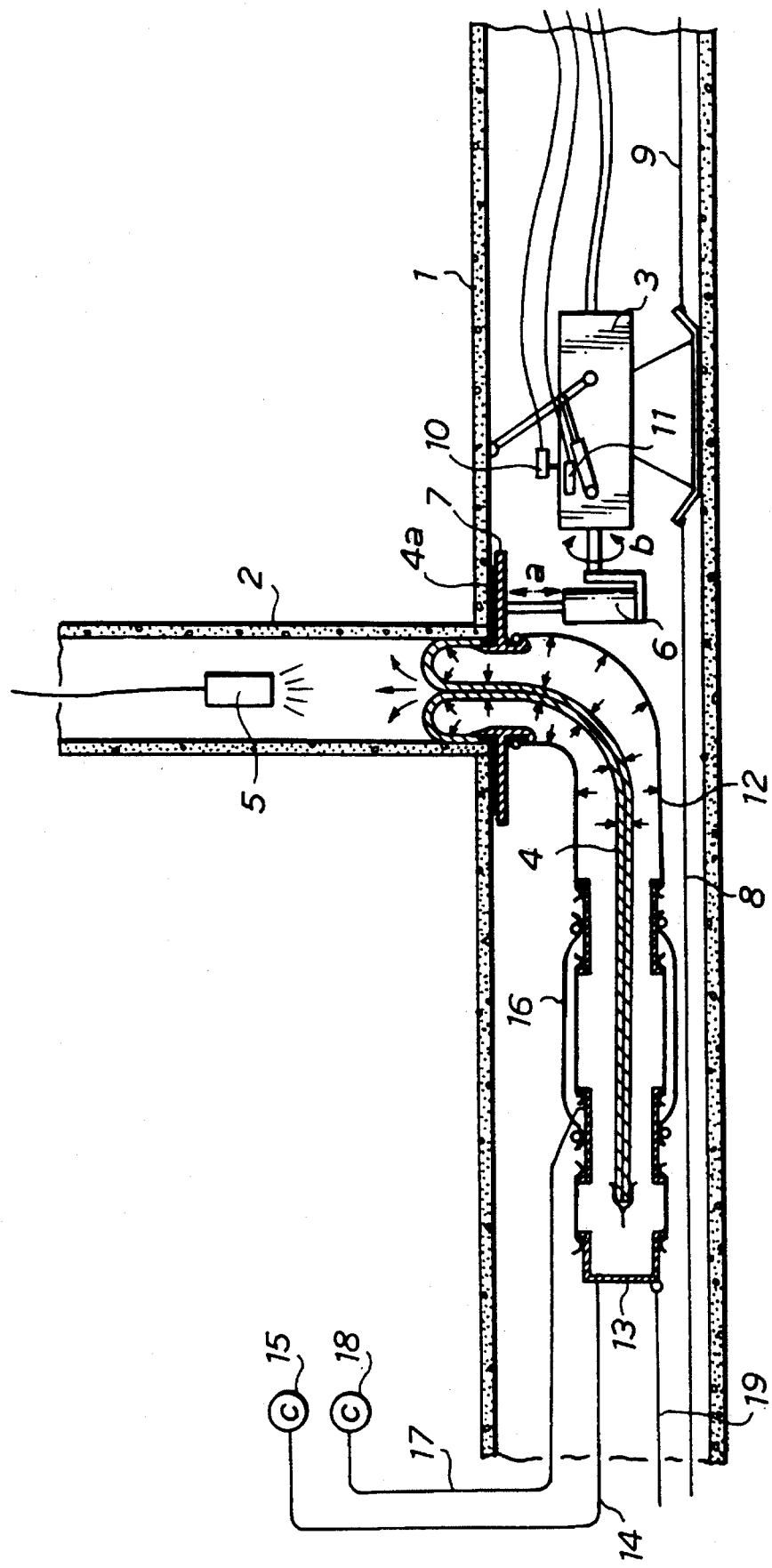
FIGS. 1–3 are cross-sectional views showing a branch pipe lining method according to the present invention in the order of its processes.
Figure 2:
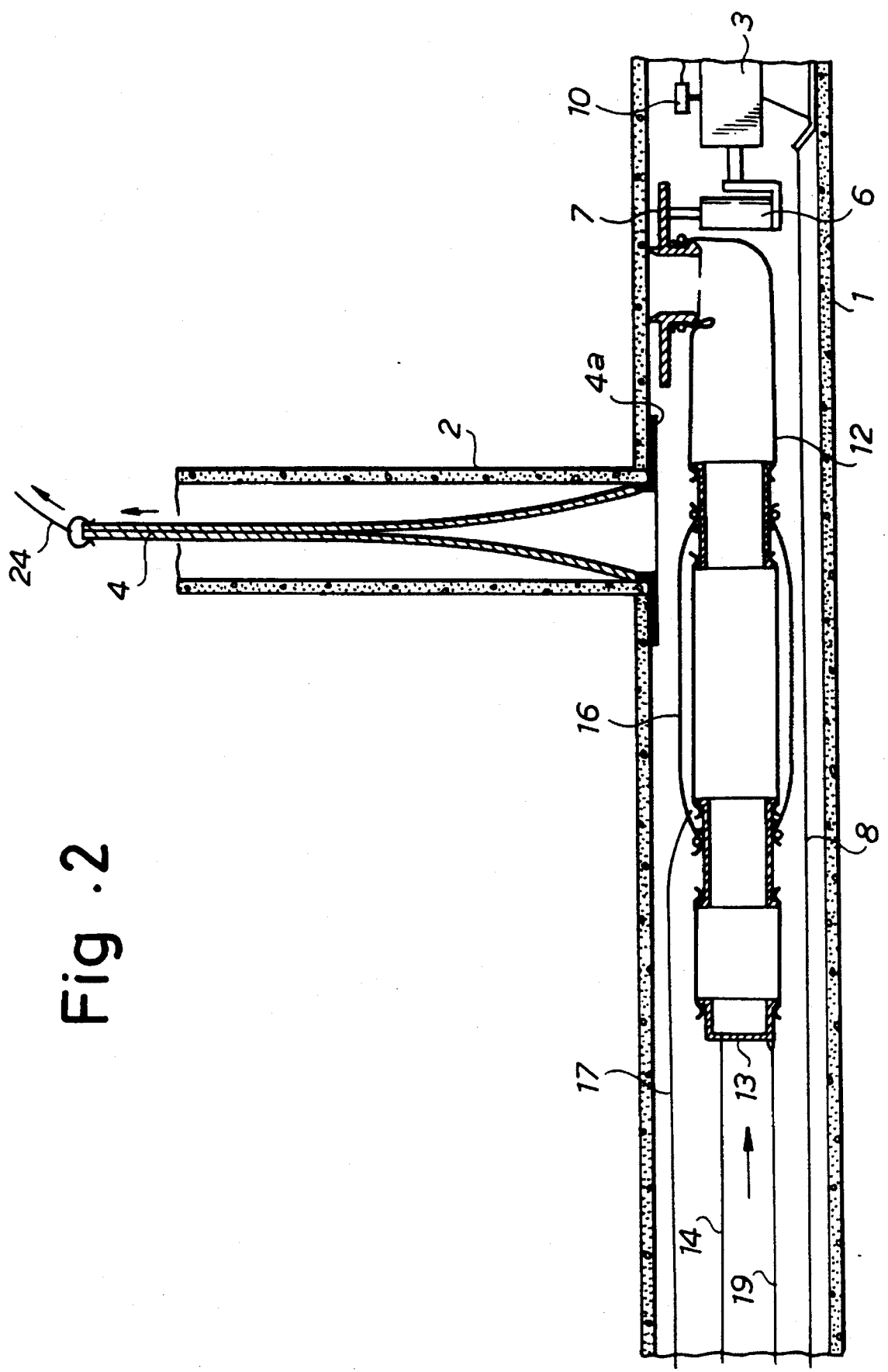
Figure 3:
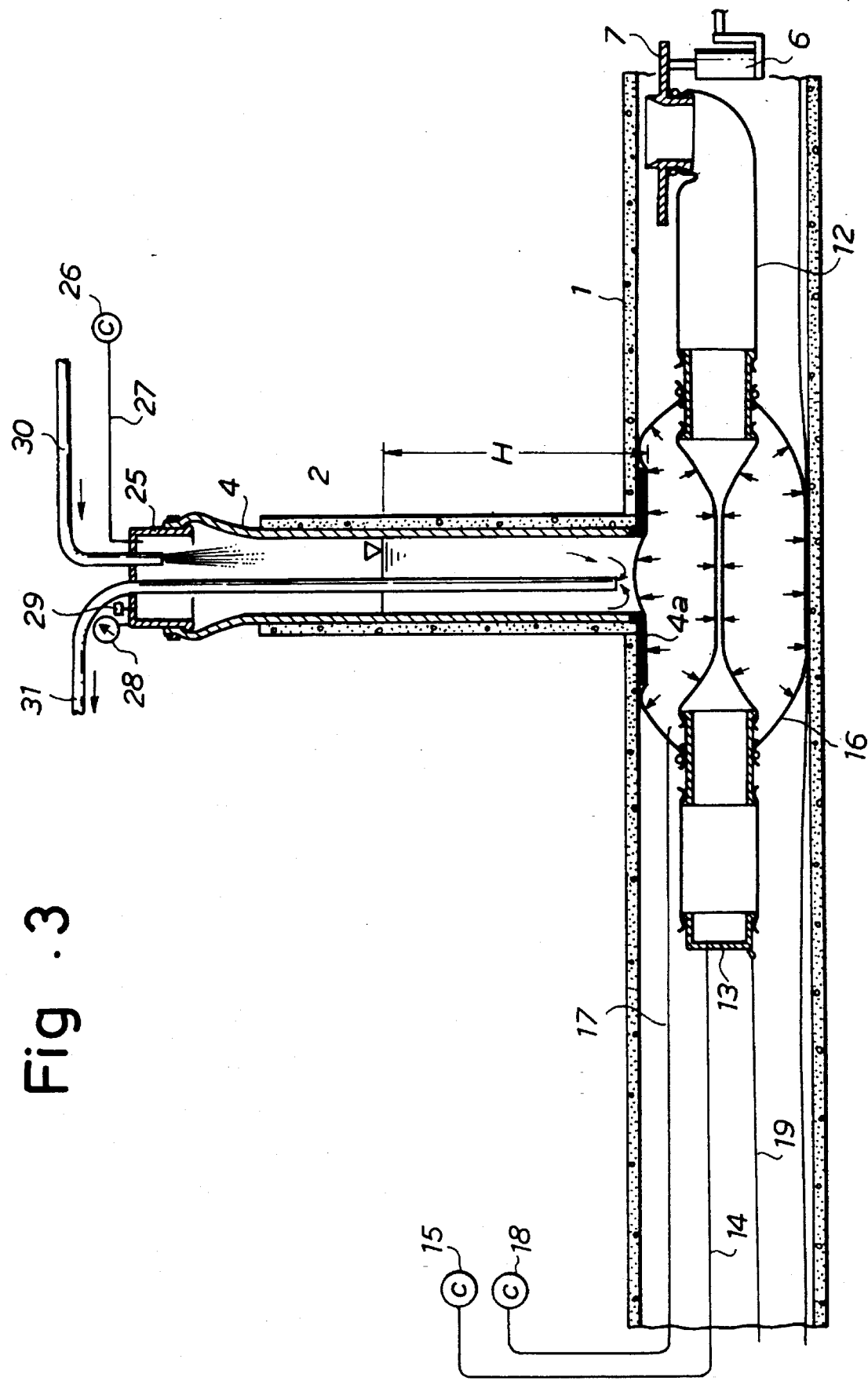

FIGS. 1–3 are cross-sectional views showing one embodiment of a method according to the present invention in the order of lining a branch pipe. In the drawings, a main pipe 1 has a branch pipe 2 having a smaller diameter and branched therefrom. A robot 3, a branch pipe liner bag 4 and so on are arranged in the main pipe 1, while a TV camera 5 for monitoring the inside of the branch pipe 21 is suspended from the above to be placed in the branch pipe 2, as illustrated.

The robot 3 is a hydraulically driven type and has a head 6 arranged for bi-directional movements along an arrow a as well as for rotation in the direction indicated by an arrow b. The head 6 also supports a fluid pressure sealing nozzle 7. The robot 3 is tied with pull ropes 8, 9 and further is equipped on the top surface thereof with a TV camera 10 for monitoring the inside of the main pipe and a lamp 11 for illumination.

To the fluid pressure sealing nozzle 7, the branch pipe liner bag 4 is mounted. More specifically, the branch pipe liner bag 11 is formed of a tubular unwoven fabric member impregnated with an unhardened thermosetting resin and having the outer surface covered with a highly sealable plastic film. One end of the branch pipe liner bag 4 is folded back to form a flange 4a, as illustrated, which is sandwiched between the nozzle 7 and the inner wall of the main pipe 1.

The thermosetting resin impregnated in the flange 4a has previously been hardened such that the flange 4a can maintain its predetermined shape (i.e., flange 4a has an arcuate surface in conformity to the shape of the inner wall of the main pipe 1). The plastic film covering the tubular unwoven fabric member may comprise a film made of polyethylene, vinyl chloride vinylon polyurethane, nylon, polypropylene, polyethylene/nylon co-polymer or the like. Materials suitable to the tubular unwoven fabric member may include polyester, nylon, acrylic resin, and vinylon. Also, the thermosetting resin may be unsaturated polyester, epoxy resin or the like.

The branch pipe liner bag 4 with its flange 4a mounted to the fluid pressure sealing nozzle 7 has the remaining uneverted portion extending through the nozzle 7 into a pressure bag 12 for everting the branch pipe liner bag 4, as shown in FIG. 1.

The pressure bag 12 has one end thereof mounted to the fluid pressure sealing nozzle 7 and the other end closed by a cap 13. The pressure bag 12 is also connected to a compressor 15 through an air hose 14. The pressure bag 12 is further provided over the outer surface thereof with an expandable and contractible tubular sealing pressure bag 16 which is connected to a compressor 18 through an air hose 17. The cap 13 is tied to one end of a pull rope 19.

Pulling the pull ropes 8, 9 causes the robot 3 as well as the branch pipe liner bag 4, the pressure bag 12 and so on supported by the robot 3 to integrally move in the main pipe 1. As the insides of the main pipe 1 and the branch pipe 2 are being monitored by the TV cameras 5, 10, the flange 4a of the branch pipe liner bag 4 is positioned at an opening communicating with the branch pipe 2, as shown in FIG. 1. Then the head 6 of the robot 3 is moved upward to press the flange 4a of the branch pipe liner bag 4 against the inner wall of the main pipe 1 such that the flange 4a is closely contacted to the inner wall of the main pipe 1.

The compressor 15 is next driven to supply compressed air to the pressure bag 12, 216 through the air hose 14, so that the branch pipe liner bag 4 is rolled inside out by the pressure of the compressed air and is successively inserted from the main pipe 1 into the branch pipe 2 toward the ground (upward direction).

Now, some examples of sealing structures which may be employed in the fluid pressure sealing nozzle 7 for providing an air-tight connection with the branch pipe liner bag 4 will be shown in FIGS. 4(a)–4(d).

Figure 4A:
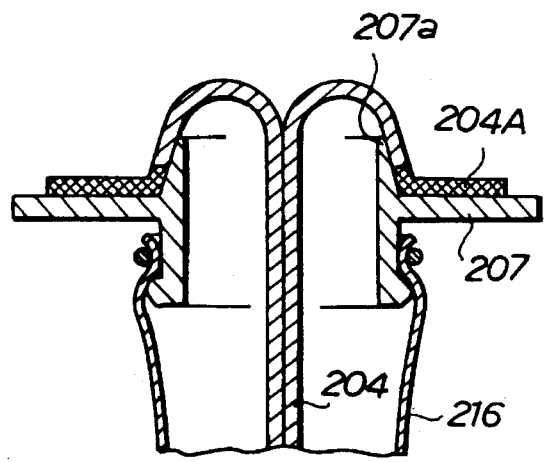
FIGS. 4(a)–4(d) show exemplary sealing structures for realizing an air-tight connection between a fluid pressure sealing nozzle and a branch pipe liner bag.

FIG. 4(a) shows a sealing structure employed in this embodiment, wherein the fluid pressure sealing nozzle 207 is formed with a tapered protrusion 207a which is used to maintain an air-tight connection between the fluid pressure sealing nozzle 207 and the branch pipe liner bag 204.

Figure 4B:
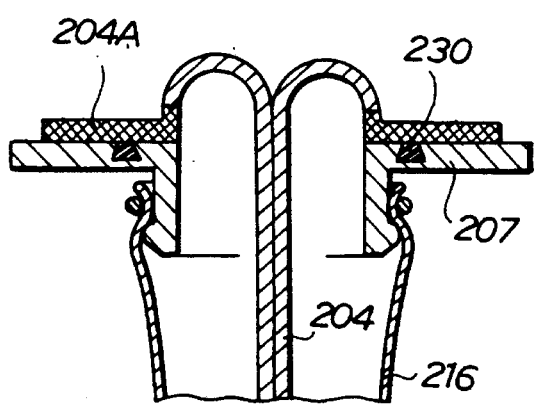
Figure 4C:
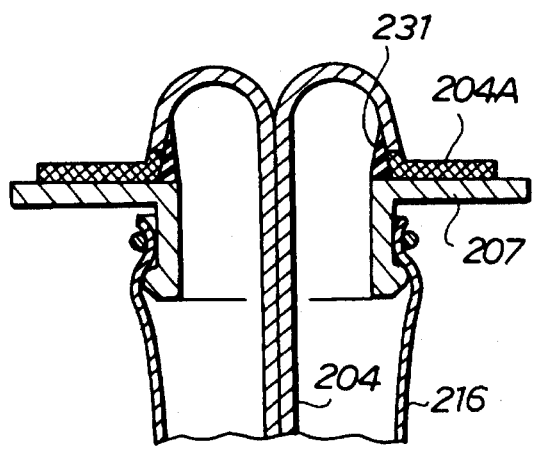

FIG. 4(b) shows a sealing structure for maintaining an air-tight connection between the fluid pressure sealing nozzle 207 and the branch pipe liner bag 204 by means of an O-ring 230 provided in the fluid pressure sealing nozzle 207, and FIG. 4(c) shows another sealing structure for the same purpose by means of a valve 231 provided on the fluid pressure sealing nozzle 207.

Figure 4D:
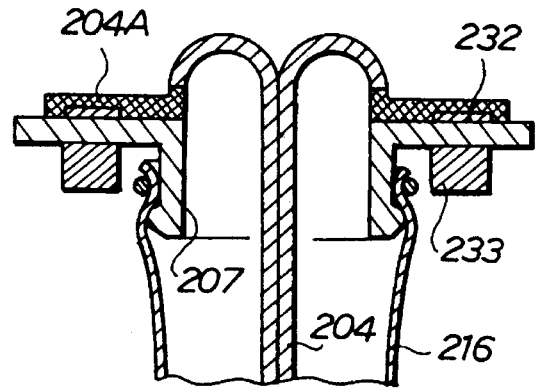

FIG. 4(d) shows a sealing structure for maintaining an air-tight connection between the fluid pressure sealing nozzle 207 and the branch pipe liner bag 4 by means of a magnetic plate 232 embedded in the flange 204a of the branch pipe liner bag 204 and a magnet 233 arranged on the nozzle 207 at a location opposing to the magnetic plate 232 such that the magnetic plate 232 and the magnet 233 attract to each other.

When the branch pipe liner bag a has been inserted into the whole length of the branch pipe 2, its upper end portion is pulled up by the use of a rope 24 from the ground, as shown in FIG. 2. In this state, the fluid pressure sealing nozzle 7 is separated from the branch pipe liner bag 4 with the flange 4a remaining secured on the inner wall of the main pipe 1. More specifically, compared to the state shown in FIG. 1, the head 6 of the robot 3 is moved downward to separate the fluid pressure sealing nozzle 7 from the flange 4a of the branch pipe liner bag 4. Thereafter, the pull rope 9 shown in FIG. 1 is used to move the robot 3, the fluid pressure sealing nozzle 7, the pressure bag 12 and so on in the right direction, as shown in FIG. 2. Then, the sealing pressure bag 16 is positioned opposite to the opening to the branch pipe 2.

After the sealing pressure bag 16 has been positioned opposite to the opening to the branch pipe 2, the compressor 18 is driven to supply compressed air to the sealing pressure bag 16 through the air hose 17. The compressed air thus supplied causes the sealing pressure bag 16 to expand, resulting in sealing the lower opening of the branch pipe liner bag 4 by the sealing pressure bag 16, as shown in FIG. 3.

Next, a cap 25 is mounted on the upper end of the branch pipe liner bag 4, as shown in FIG. 3, through which compressed air is supplied to the branch pipe liner bag 4 through an air hose 27 by driving a compressor 26. This causes the branch pipe liner bag 4 to be expanded by the pressure of the compressed air and accordingly pressed against the inner wall of the branch pipe 2. The cap 25 may be equipped with a pressure gauge 28 and a safety valve 29, as illustrated.

Then, with the above state being maintained, hot water is supplied to the branch pipe liner bag 4 through a hot water hose 30 introduced into the branch pipe liner bag 4, and discharged therefrom through a discharge hose 31. By repeating these operations, the thermosetting resin impregnated in the branch pipe liner bag 4 is heated and therefore hardened, whereby the inner wall of the branch pipe 2 is lined by the hardened branch pipe liner bag 4, thus repairing the branch pipe 2.

It should be noted herein that since the head pressure of the hot water is expressed by $\gamma \cdot H$, where $\gamma$ represents the weight volume ratio of the hot water in the branch pipe liner bag 4 and H the height of the same, it is necessary to maintain the inner pressure P of the sealing pressure bag 16 at a level higher than the head pressure $\gamma \cdot H$ ($P > \gamma \cdot H$).

After the branch pipe liner bag 4 has been hardened as described above, the hot water within the branch pipe liner bag 4 is extracted, and the sealing pressure bag 16 is removed from the main pipe 1. In this manner, the hardened branch pipe liner bag 4 only remains on the inner wall of the branch pipe 2, that is, the branch pipe 2 has been lined or repaired by the branch pipe liner bag 4, thus completing a sequence of repairing operations for the branch pipe 2.

Figure 5:
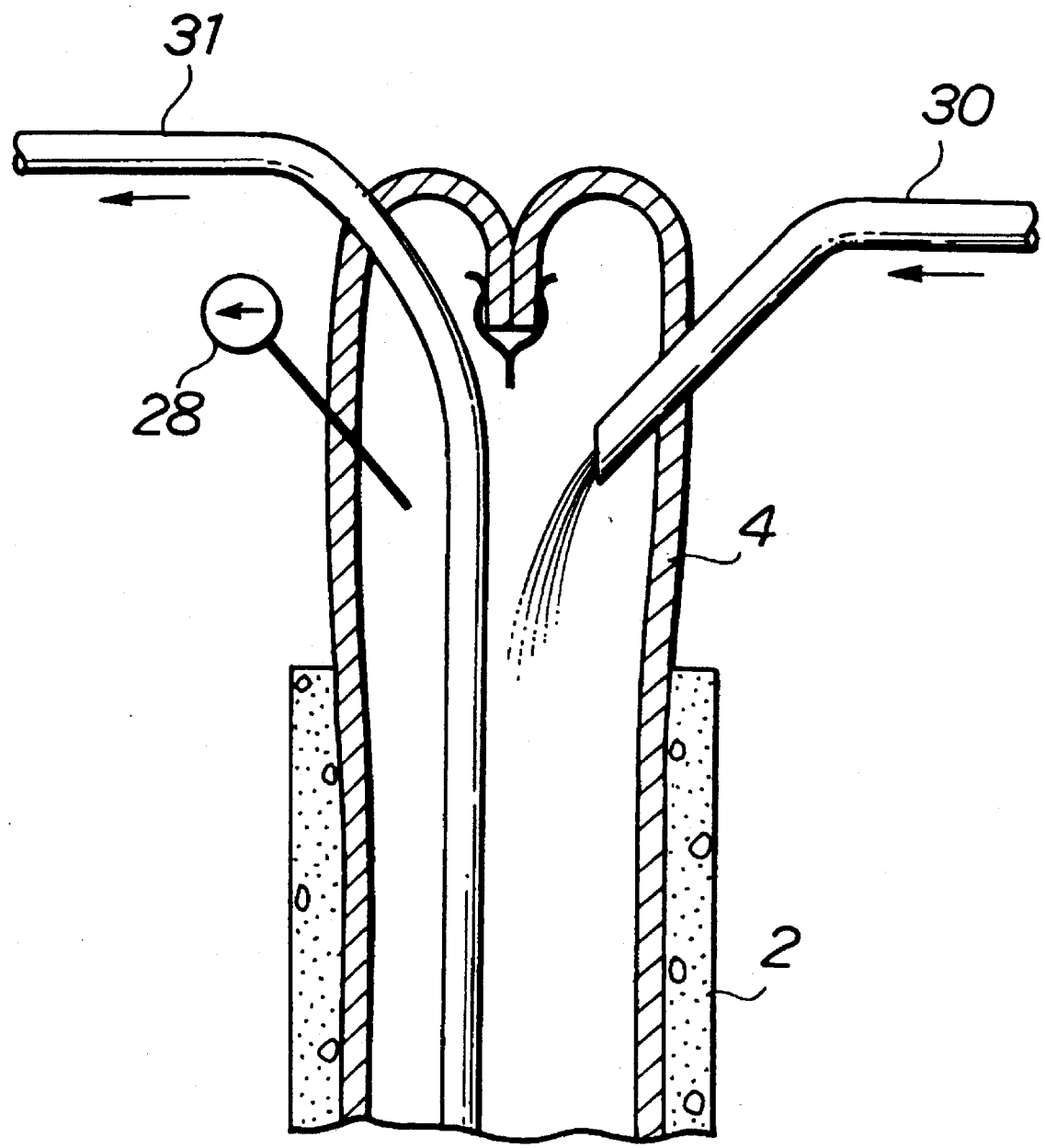
FIG. 5 is a cross-sectional view showing another embodiment of a structure for sealing an upper end of a branch pipe liner bag.

In the alternative, the upper end of the branch pipe liner bag 4 may be closed without using the cap 25, and the hot water supply hose 30, the hot water discharge hose 31 and the pressure gauge 28 may be directly inserted into the branch pipe liner bag 4, as shown in FIG. 5.

Figure 11:
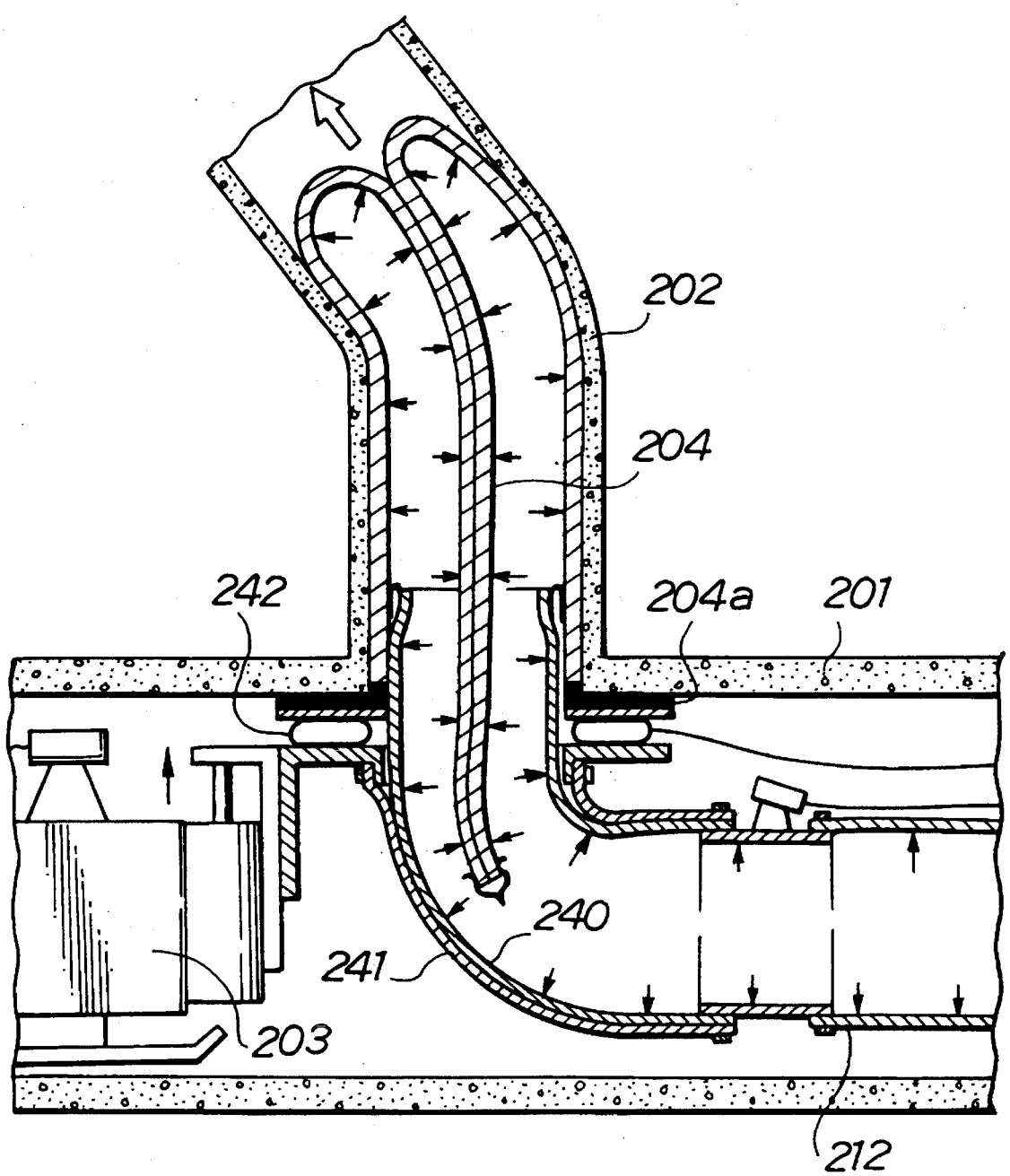
Figure 12:
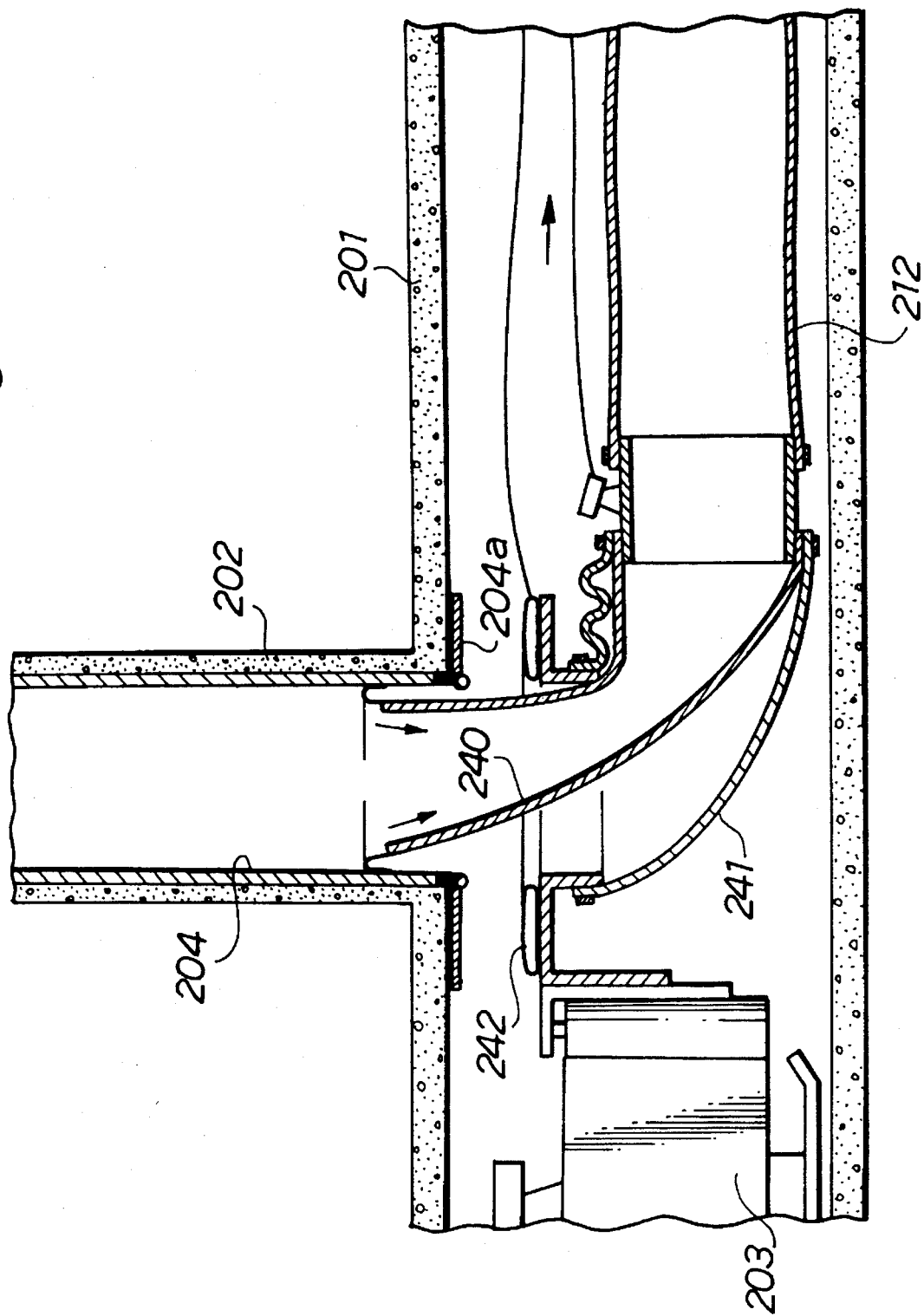

According to this embodiment as described above, an air-tight connection between the pressure bag 12 and the branch pipe liner bag 4 is achieved without a conventional separator tube such as that indicated by 240 in FIG. 11. Instead, the sealing pressure bag 16 is used to seal the lower opening of the branch pipe liner bag 4, which is required when the branch pipe liner bag 4 is to be hardened. Since the sealing pressure bag 16 can be easily removed from the branch pipe liner bag 4 after it has been hardened, any fragment of the sealing pressure bag 16 will not remain on the inner wall of the branch pipe 2 (or the branch pipe liner bag 4 lined thereon), after the branch pipe 2 has been lined, so that the inner wall surface of the branch pipe 2 is maintained in a favorable condition.

Figure 6:
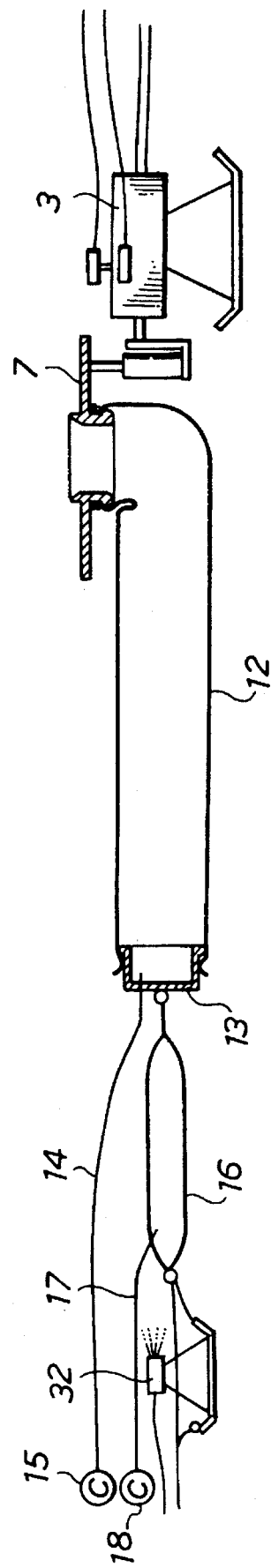
FIG. 6 is a cross-sectional view showing a sealing pressure bag which is arranged behind a pressure bag for eversion.

While in the foregoing embodiment, the sealing pressure 16 is arranged outside the pressure bag 12 for eversion, the sealing pressure bag 16 may be placed behind the pressure bag 12 for eversion as shown in FIG. 6. In this case, a TV camera 32 is connected to the sealing pressure bag 16 on the rear side thereof, as illustrated.

Figure 7:
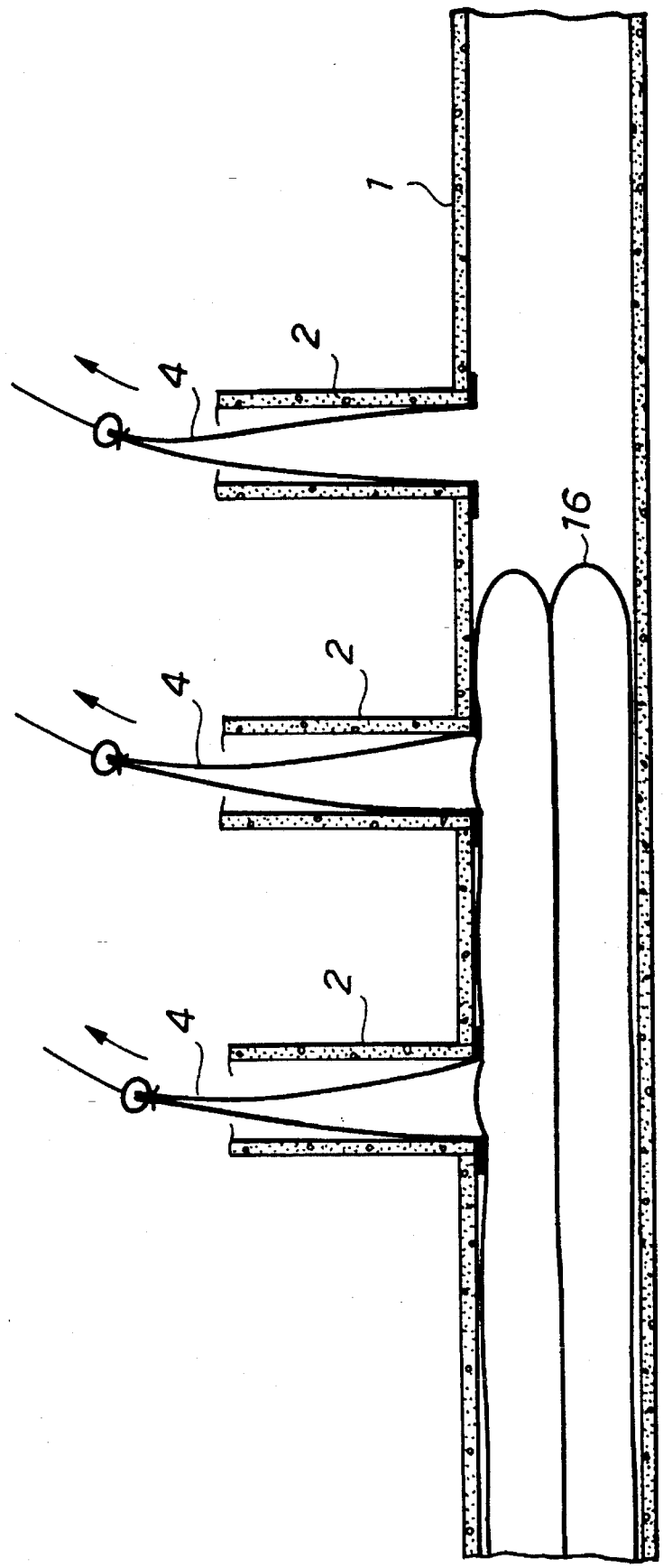
FIG. 7 is a cross-sectional view showing another embodiment for simultaneously sealing lower openings of a plurality of branch pipe liner bags.

FIG. 7 shows an alternative embodiment of the present invention which is suitable foe lining a plurality of branch pipes at the same time. More specifically, branch pipe lines bags 4, everted and inserted into their corresponding branch pipes 2 branched from a main pipe 1, have their upper ends pulled up from the ground. Then, a long tube-type sealing pressure bag 16 is everted into the main pipe 1 by a fluid pressure to simultaneously seal lower openings of the respective branch pipe liner bags 4. Other operations are similar to the aforementioned embodiment described above.

Figure 8:
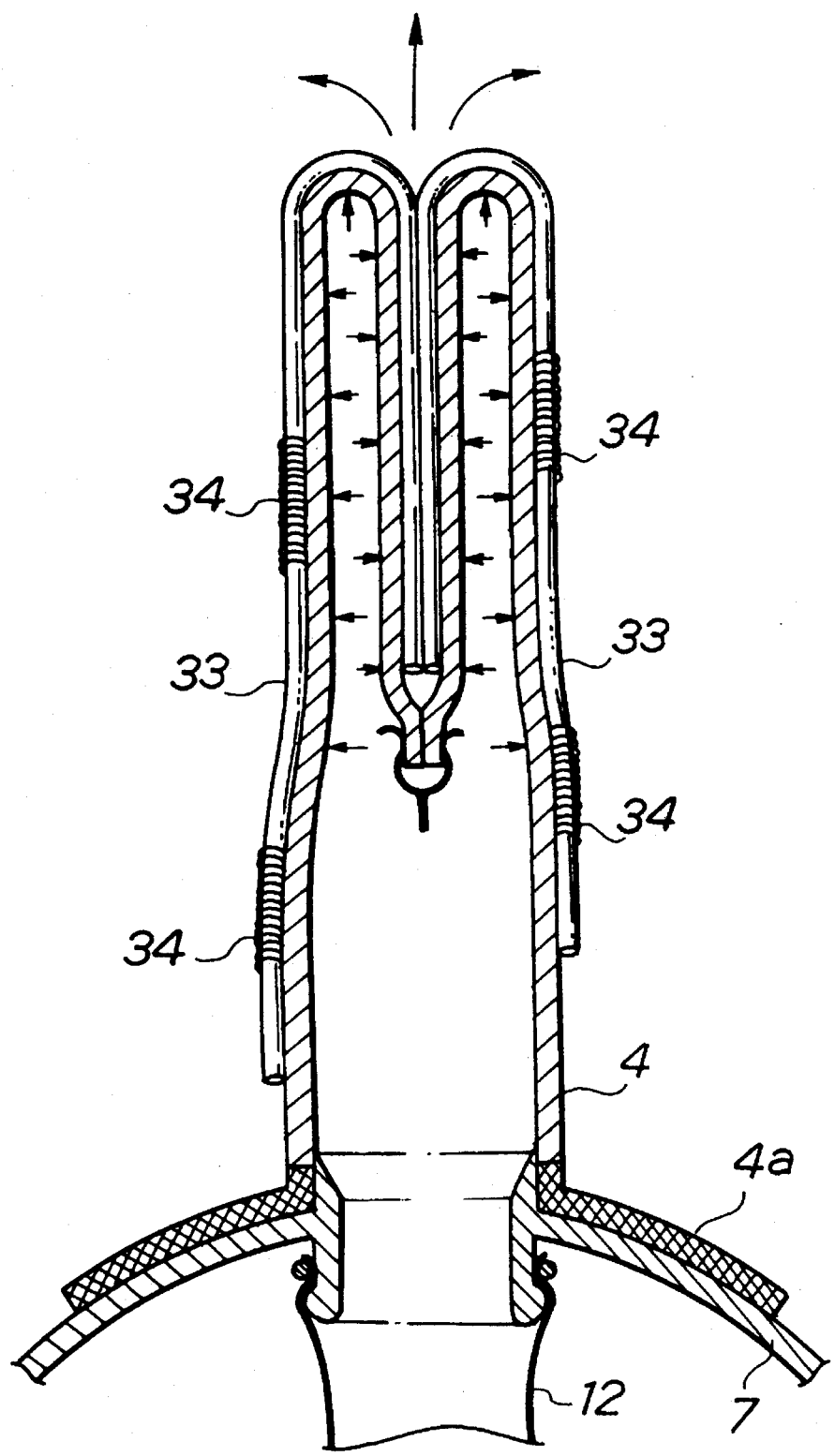
FIGS. 8 and 9 show other embodiments of the present invention in cross-sectional form.
Figure 9:
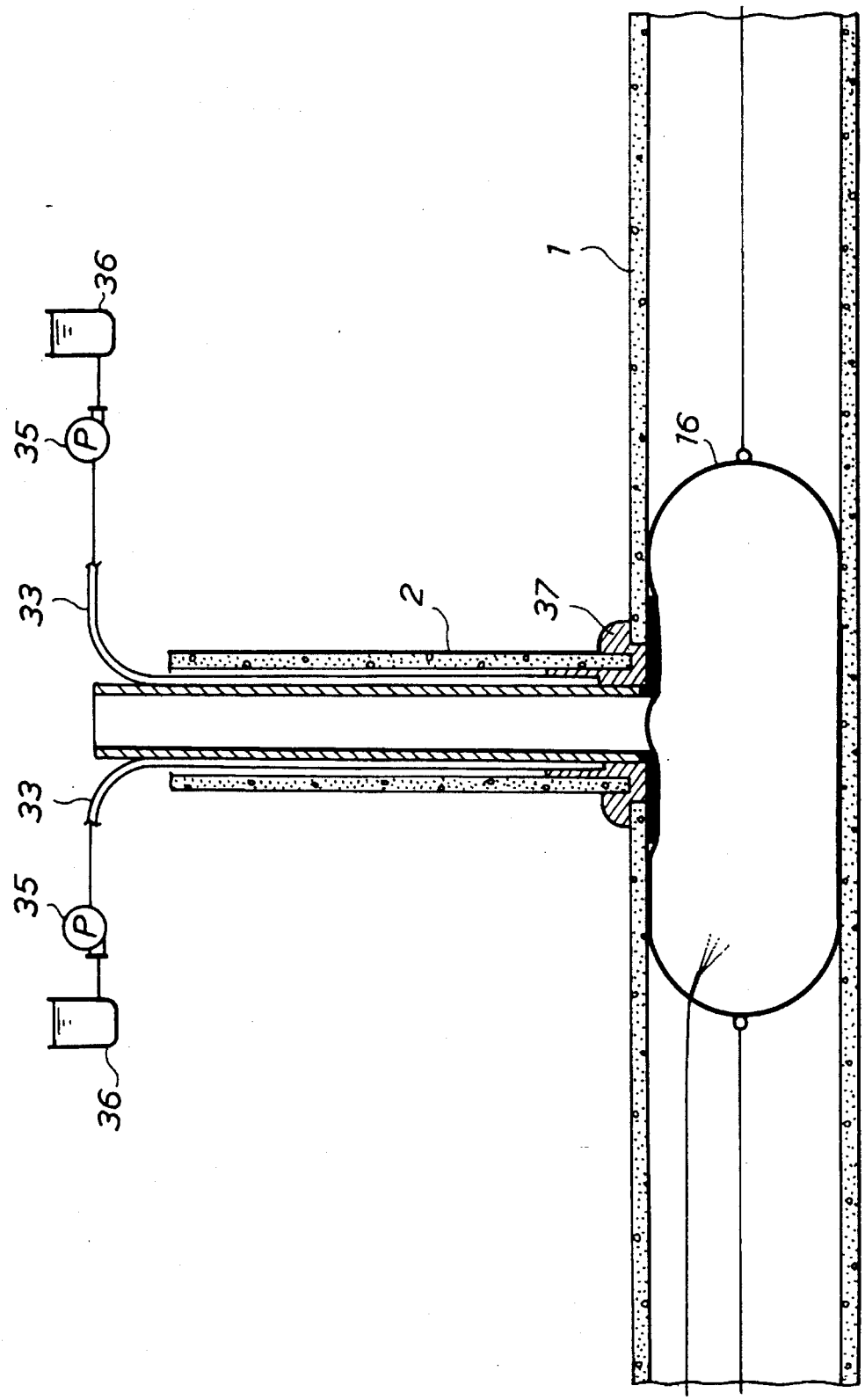
Figure 10:
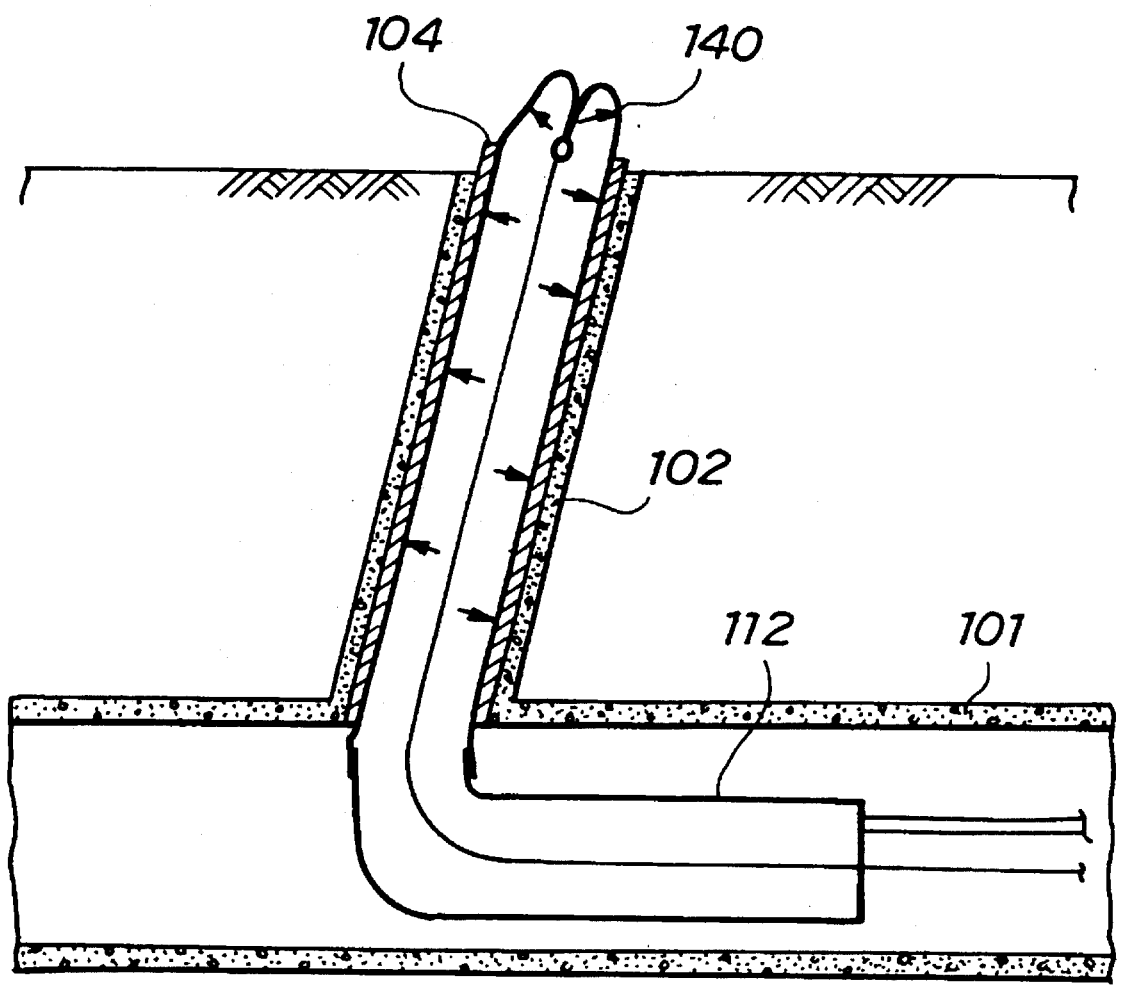
FIGS. 10–12 are cross-sectional views showing a conventional branch pipe lining method.

FIGS. 8 and 9 show another embodiment wherein a filler injecting tube 33 is fixed on the inner wall of a branch pipe liner bag 4 before everted by means of a plurality of tubular fixtures 34. When the branch pipe liner bag 4 is everted, the filler injecting tube 33 appears outside of the branch pipe liner bag 4.

After the branch pipe liner bag 4 is everted into a branch pipe 2, a lower opening thereof is sealed by a sealing pressure bag 16, which expands inside a main pipe 1, and a thermosetting resin impregnated in the branch pipe liner bag 4 is hardened, a pump 35 is driven to fill a gap between the branch pipe 2 and the branch pipe liner bag 4 and the juncture of the main pipe 1 and the branch pipe 2 with a filler 37 such as cement milk, thermosetting resin or the like contained in a tank 36 is supplied through the filler injecting tube 33, with the lower opening of the branch pipe liner bag 4 being still sealed by the sealing pressure bag 16. This causes the gap between the branch pipe 2 and the branch pipe liner bag 4 to be filled with the filler 37 to prevent inconveniences such as the branch pipe liner bag 4 slipping down to the main pipe 1. Also, a waterstop effect of the filler 37 prevents water or the like from penetrating from the juncture where the main pipe 1 and the branch pipe 2 meet each other.

The filler injecting tube 33 may be made of plastic, polyurethane, nylon, vinyl chloride or the like, while the fixtures 34 may be made of tubular plstic fabric, unwoven fabric or film.

As is apparent from the above description, the branch pipe lining method of the present invention utilizes a branch pipe liner bag impregnated with a hardenable resin and having a flange at one end thereof, wherein the flange is folded out and mounted to a fluid pressure sealing nozzle; the branch pipe liner bag is everted and inserted from a main pipe into a branch pipe toward the ground, an upper end of the branch pipe liner bag is pulled up by a rope or the like with the flange thereof secured on the inner wall of the main pipe; the fluid pressure sealing nozzle is removed from the branch pipe liner bag; a sealing pressure bag introduced into the main pipe is expanded to seal a lower opening of the branch pipe liner bag with the sealing pressure bag; the upper end of the branch pipe liner bag is closed, and the branch pipe liner bag is pressed against the inner wall of the branch pipe with a fluid pressure; and the hardenable resin impregnated in the branch pipe liner bag is hardened while the branch pipe liner bag is continuously being pressed against the inner wall of the branch pipe.

Since the sealing pressure bag can be easily removed from the branch pipe liner bag after it has been hardened, any fragment of the sealing pressure bag will not remain on the inner wall of the branch pipe (or the branch pipe liner bag lined thereon), after the branch pipe has been lined, so that the inner wall surface of the branch pipe can be maintained in a favorable condition.

While the invention has been described in its preferred embodiment, it is to be understood that modifications will occur to those skilled in the art without departing from the spirit of the invention. The scope of the invention is therefore to be determined solely by the appended claims.

What is claimed is:

1. A method of lining a branch pipe using a branch pipe liner bag impregnated with a hardenable resin and having a flange at one end thereof, comprising the steps of:

folding out said flange to mount the same to a fluid pressure sealing nozzle;

everting said branch pipe liner bag and inserting the same from a main pipe into a branch pipe toward the ground, pulling up an upper end of said branch pipe liner bag with the flange thereof secured on the inner wall of the main pipe;

removing said fluid pressure sealing nozzle from said branch pipe liner bag;

expanding a sealing pressure bag introduced into the main pipe to seal a lower opening of said branch pipe liner bag with said sealing pressure bag;

closing the upper end of said branch pipe liner bag, and pressing said branch pipe liner bag against the inner wall of the branch pipe with a fluid pressure; and hardening the hardenable resin impregnated in said branch pipe liner bag while said branch pipe liner bag is continuously being pressed against the inner wall of the branch pipe.

2. A branch pipe lining method according to claim 1, wherein said branch pipe liner bag is provided with a filler injecting tube such that after the hardenable resin impregnated in said branch pipe liner bag has been hardened, a filler is injected into predetermined locations through said filler injecting tube, while the lower opening of said branch pipe liner bag is kept sealed by said sealing pressure bag.

3. A branch pipe lining method according to claim 2, wherein said filler is injected into a gap between said branch pipe and said branch pipe liner bag and into the juncture of said main pipe and said branch pipe.

4. A branch pipe lining method according to claim 2, wherein said filler injecting tube is fixed on the inner wall of said branch pipe liner bag by means of a plurality of tubular fixtures.

5. A branch pipe lining method according to claim 1, wherein said branch pipe liner bag is air-tight connected with said fluid pressure sealing nozzle by means of a tapered protrusion formed in said fluid pressure sealing nozzle.

6. A branch pipe lining method according to claim 1, wherein said branch pipe liner bag is air-tight connected with said fluid pressure sealing nozzle by means of an O-ring provided in said fluid pressure sealing nozzle.

7. A branch pipe lining method according to claim 1, wherein said branch pipe liner bag is air-tight connected with said fluid pressure sealing nozzle by means of a valve provided on said fluid pressure sealing nozzle.

8. A branch pipe lining method according to claim 1, wherein said branch pipe liner bag is air-tight connected with said fluid pressure sealing nozzle by means of a magnetic plate embedded in said flange of said branch pipe liner bag and a magnet arranged on said fluid pressure sealing nozzle at a location opposing to said magnetic plate such that said magnetic plate and said magnet attract to each other.

9. A method of lining a plurality of branch pipes using branch pipe liner bags, each impregnated with a hardenable resin and having a flange at one end thereof, comprising the steps of:

folding out said flange of each of said branch pipe liner bags to mount the same to a fluid pressure sealing nozzle;

everting said each branch pipe liner bag and inserting the same from a main pipe into a corresponding branch pipe toward the ground, pulling up an upper end of said each branch pipe liner bag with the flange thereof secured on the inner wall of the main pipe;

removing said fluid pressure sealing nozzle from said each branch pipe liner bag;

everting a sealing pressure bag and inserting the same into the main pipe by a fluid pressure to simultaneously seal lower openings of said respective branch pipes;

closing the upper end of said each branch pipe liner bag, and pressing said each branch pipe liner bag against the inner wall of the corresponding branch pipe with a fluid pressure; and hardening the hardenable resin impregnated in said each branch pipe liner bag while said each branch pipe liner bag is continuously being pressed against the inner wall of the branch pipe.

\* \* \* \* \*